(12) United States Patent
Gaikwad et al.

(10) Patent No.: US 7,587,016 B2
(45) Date of Patent: Sep. 8, 2009

(54) MIMO TIMING RECOVERY

(75) Inventors: Rohit V. Gaikwad, San Diego, CA (US); Rajendra Tushar Moorti, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 568 days.

(21) Appl. No.: 11/402,572

(22) Filed: Apr. 12, 2006

(65) Prior Publication Data

US 2007/0019750 A1 Jan. 25, 2007

Related U.S. Application Data

(60) Provisional application No. 60/700,968, filed on Jul. 20, 2005, provisional application No. 60/700,967, filed on Jul. 20, 2005.

(51) Int. Cl.
*H04L 7/00* (2006.01)
*H04L 27/00* (2006.01)
*H04L 27/06* (2006.01)

(52) U.S. Cl. .................. 375/355; 375/326; 375/343

(58) Field of Classification Search .......... 375/147, 375/150, 152, 260, 326, 327, 343, 344, 354, 375/267, 316, 323, 347, 349, 355; 370/208, 370/308, 329, 335, 342, 355; 455/525; 327/37–41, 327/44–47, 50, 60, 69, 82, 91, 115–117
See application file for complete search history.

(56) References Cited

U.S. PATENT DOCUMENTS

| | | | | |
|---|---|---|---|---|
| 4,004,226 A * | 1/1977 | Qureshi et al. | ............... | 375/231 |
| 5,742,636 A * | 4/1998 | Fukushi | ...................... | 375/130 |
| 5,883,920 A * | 3/1999 | Maruyama et al. | .......... | 375/130 |
| 6,628,738 B1 * | 9/2003 | Peeters et al. | ................ | 375/371 |
| 7,024,191 B2 * | 4/2006 | Ofuji et al. | ............... | 455/432.1 |
| 7,269,125 B2 * | 9/2007 | Smallcomb | .................. | 370/208 |
| 7,305,048 B2 * | 12/2007 | Hwang et al. | ................ | 375/316 |
| 7,349,464 B2 * | 3/2008 | Kimura | ...................... | 375/152 |
| 2002/0042534 A1 * | 4/2002 | Murahashi et al. | .......... | 558/320 |
| 2004/0042534 A1 * | 3/2004 | Raphaeli et al. | .............. | 375/150 |
| 2004/0071221 A1 * | 4/2004 | Nakada et al. | ............... | 375/260 |
| 2005/0220230 A1 * | 10/2005 | Fukuda | ........................ | 375/343 |
| 2007/0019749 A1 * | 1/2007 | Gaikwad et al. | ............ | 375/260 |

\* cited by examiner

*Primary Examiner*—Tesfaldet Bocure
*Assistant Examiner*—Lawrence B Williams
(74) *Attorney, Agent, or Firm*—Garlick Harrison & Markison; Shayne X. Short

(57) ABSTRACT

Multiple-input-multiple-output (MIMO) timing recovery. A novel approach is presented to perform timing recovery when processing the multiple received signals within a MIMO communication device. This may be implemented for a singular received signal, or a plurality of received signal streams. In addition, this timing recovery may be performed in conjunction with carrier detection to provide more robust performance. Alternatively, indicia and/or signals corresponding to carrier detection of these signals may be provided to timing recovery functionality from carrier detection functionality external to the timing recovery functionality. Certain processing and analysis is performed on a modified correlation function that is generated using samples of moving windows that pass over symbols of a packet. Based on this analysis of the modified correlation function, and sometimes in conjunction with one or more carrier detect signals, timing recovery may be performed thereby locating the point at which decoding of the packet may be performed.

25 Claims, 11 Drawing Sheets

MIMO TIMING RECOVERY

CROSS REFERENCE TO RELATED PATENTS/PATENT APPLICATIONS

Provisional Priority Claims

The present U.S. Utility Patent Application claims priority pursuant to 35 U.S.C. § 119(e) to the following U.S. Provisional Patent Applications which are hereby incorporated herein by reference in their entirety and made part of the present U.S. Utility Patent Application for all purposes:

1. U.S. Provisional Application Ser. No. 60/700,968, entitled "Carrier detection applicable for SISO, MIMO, MISO, and SIMO communications," filed Wednesday, Jul. 20, 2005 (Jul. 20, 2005), pending.

2. U.S. Provisional Application Ser. No. 60/700,967, entitled "MIMO timing recovery," filed Wednesday, Jul. 20, 2005 (Jul. 20, 2005), pending.

Incorporation by Reference

The following U.S. Utility Patent Applications is hereby incorporated herein by reference in its entirety and made part of the present U.S. Utility Patent Application for all purposes:

1. U.S. Utility patent application Ser. No. 11/168,793, entitled "Reduced feedback for beamforming in a wireless communication," filed Jun. 28, 2005 (Jun. 28, 2005), pending.

BACKGROUND OF THE INVENTION

1. Technical Field of the Invention

The invention relates generally to communication systems; and, more particularly, it relates to performing timing recovery for signals within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

Within such communication systems that process and extract packets from a received signal, there is typically a need to set make decisions related to the various portions of the packet. For example, when decoding a packet that includes a preamble and a payload (e.g., data), the communication device processing typically needs to determine precisely where the payload portion of the packet is within the overall packet. This may generally be referred to as performing timing recovery. If this decision making is not performed well, then the information contained within the payload portion of the packet may be improperly decoded.

Moreover, there are instances where a particular location within either the preamble or the payload is desired to be known to assist in the training of the communication device. For example, portions of the preamble may sometimes be employed to make channel estimates for use in performing channel equalization among other types of compensation that may be performed to overcome the deficiencies of the communication channel through which the signal has traveled. As such, a need continues to exist in the art for better and more effective means by which timing recovery may be performed with respect to a received signal to govern the configuration and set up of such a communication device implemented to process the received signal. More specifically, there exists a need for better and more effective means to determine a particular location at which to begin processing a packet that is extracted from a received signal in an effort to extract information contained therein.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
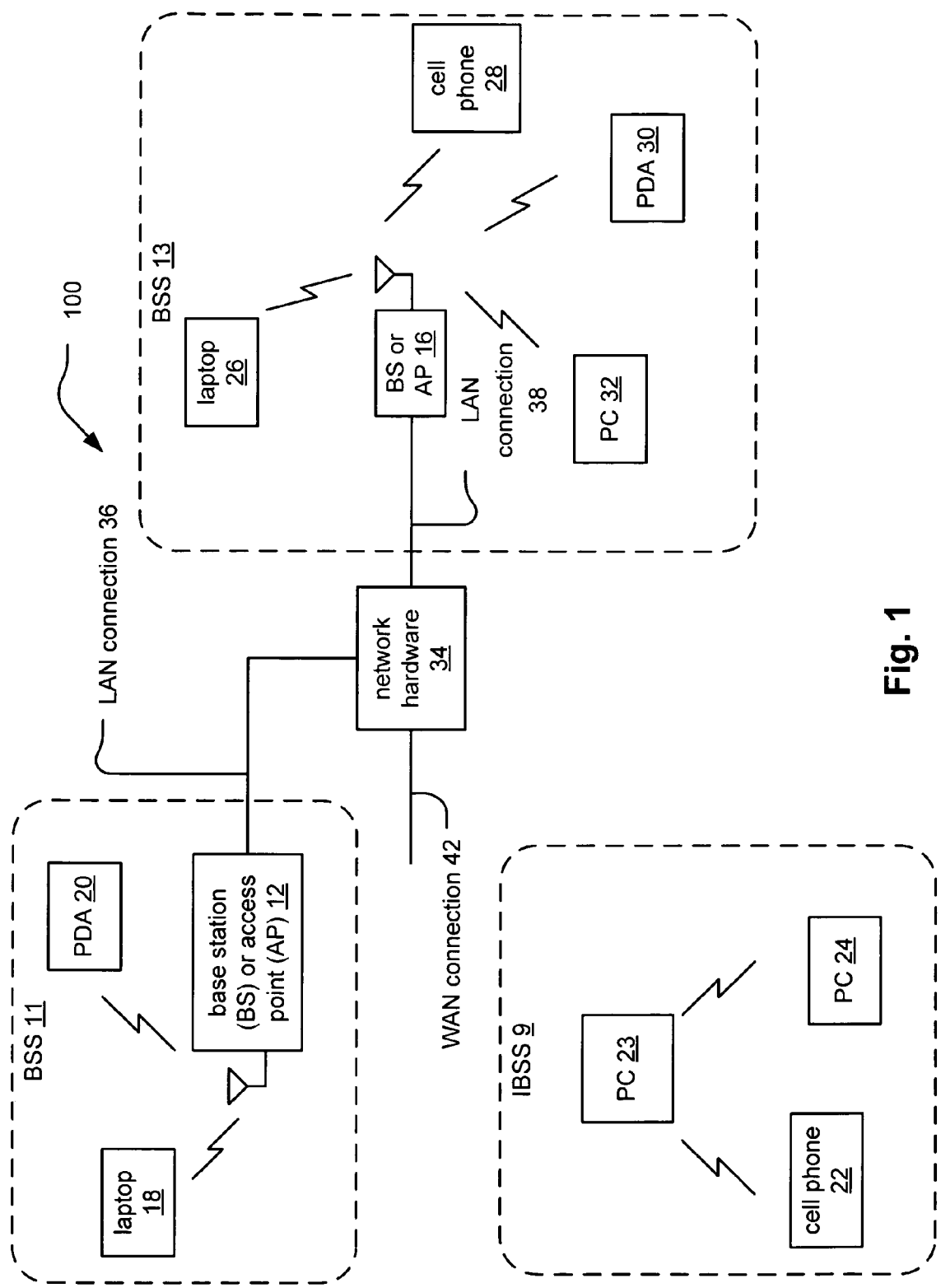
FIG. 1 is a diagram of a wireless communication system.

FIG. 1 is a diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
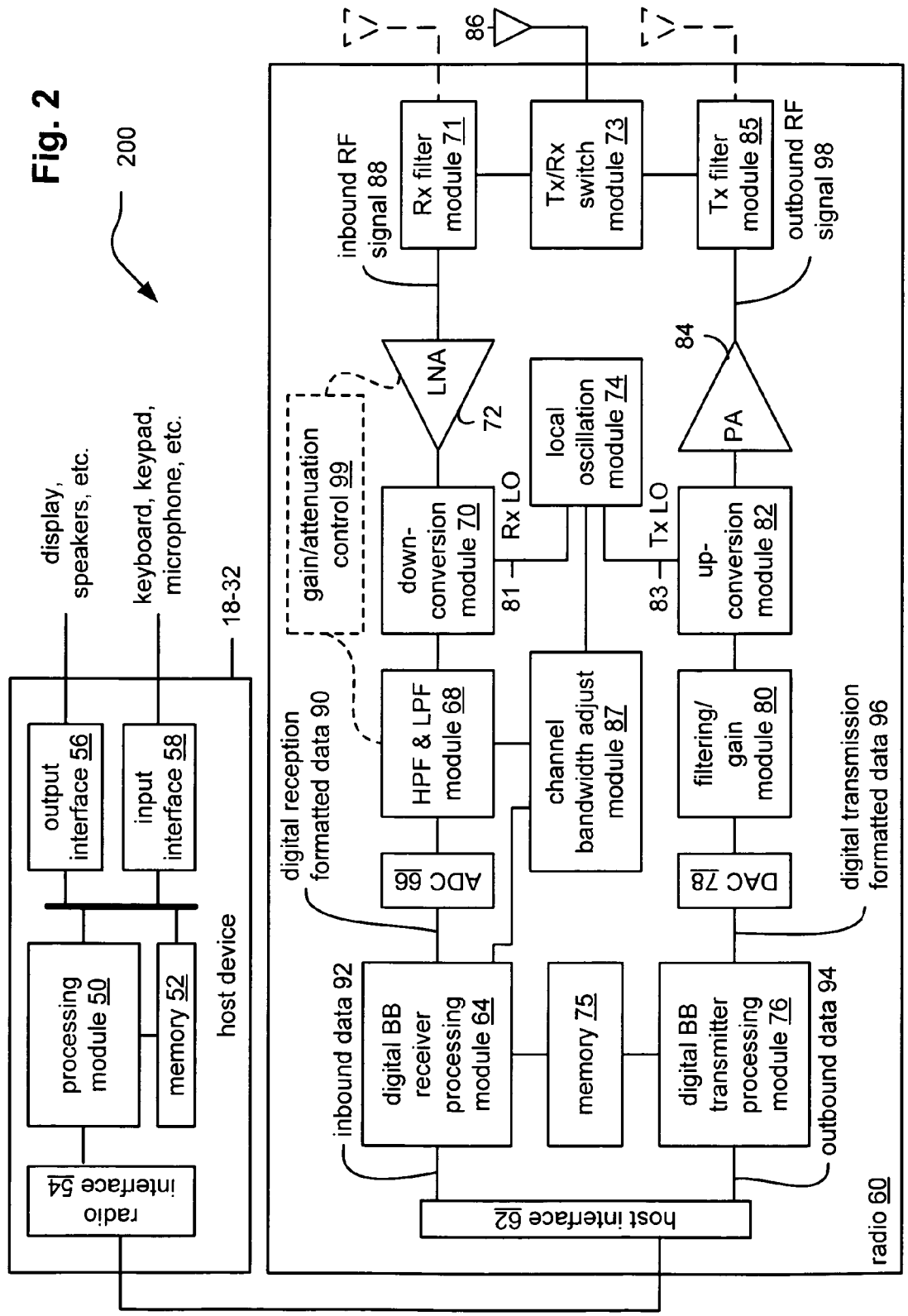
FIG. 2 is a diagram of a wireless communication device.

FIG. 2 is a diagram illustrating a wireless communication device 200 that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86.

It is noted that one or both of the high pass and low pass filter module 68 and the low noise amplifier 72 can operate to perform any desired gain and/or attenuation of the inbound RF signal 88 (i.e., using the low noise amplifier 72) or the down-converted version thereof (i.e., using the high pass and low pass filter module 68), as indicated by the reference numeral 99. A packet gain signal can be provided from one or both of the high pass and low pass filter module 68 and the low noise amplifier 72 to indicate that the gain has settled (i.e., undergone any change, passed through any transient period, and settled to a new steady state operating level for the packet).

The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device 200 is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kHz (kilo-Hertz) to a few MHz (Mega-Hertz).

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device 200.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kHz to a few MHz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device 200 of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
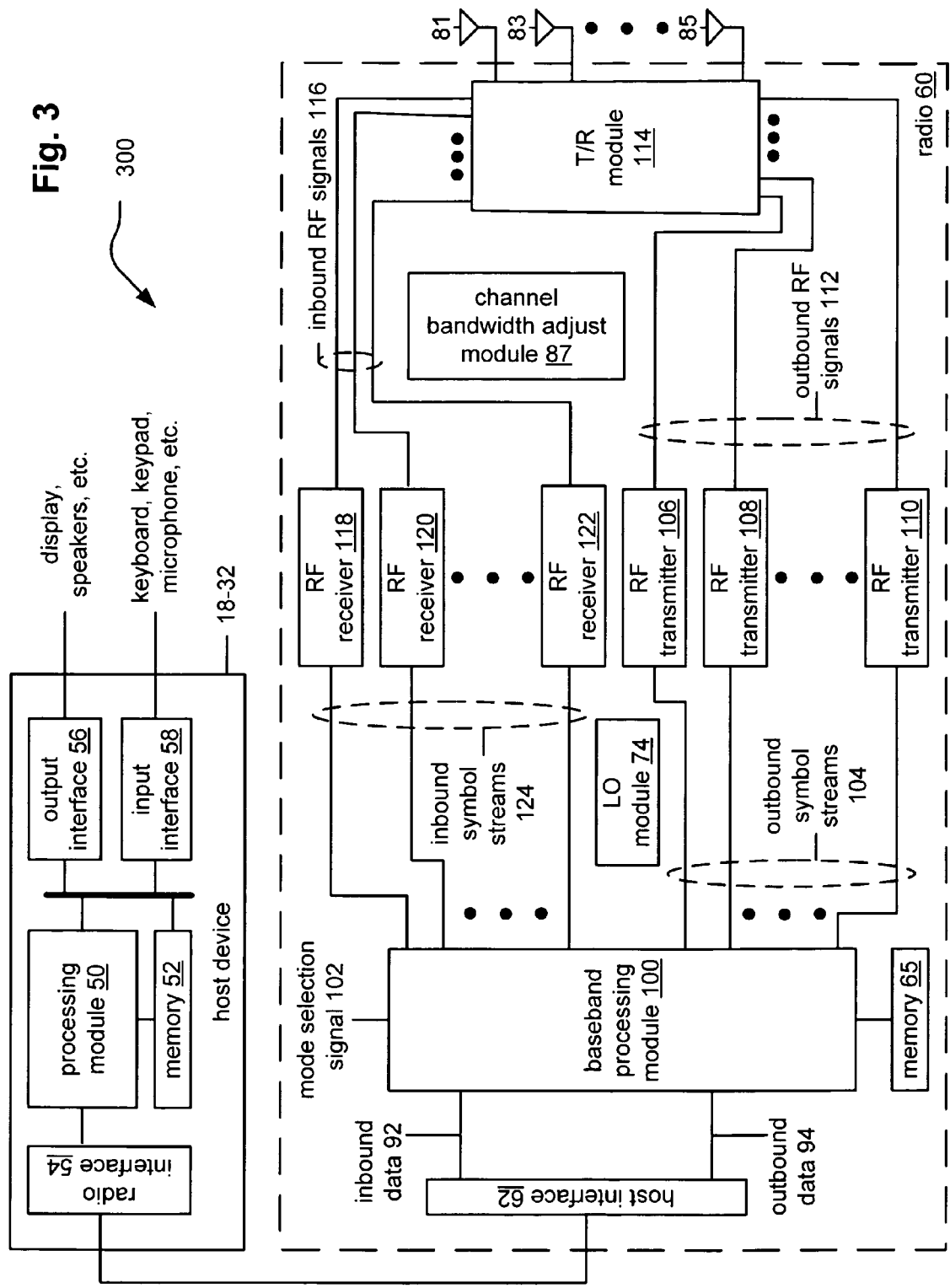
FIG. 3 is a diagram of another wireless communication device.

FIG. 3 is a diagram illustrating a wireless communication device 300 that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation de-mapping, decoding, de-interleaving, fast Fourier transform (FFT), cyclic prefix removal, space and time decoding, and/or descrambling. The digital transmitter functions include, but are not limited to, scrambling, encoding, interleaving, constellation mapping, modulation, inverse fast Fourier transform (IFFT), cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device 300 of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
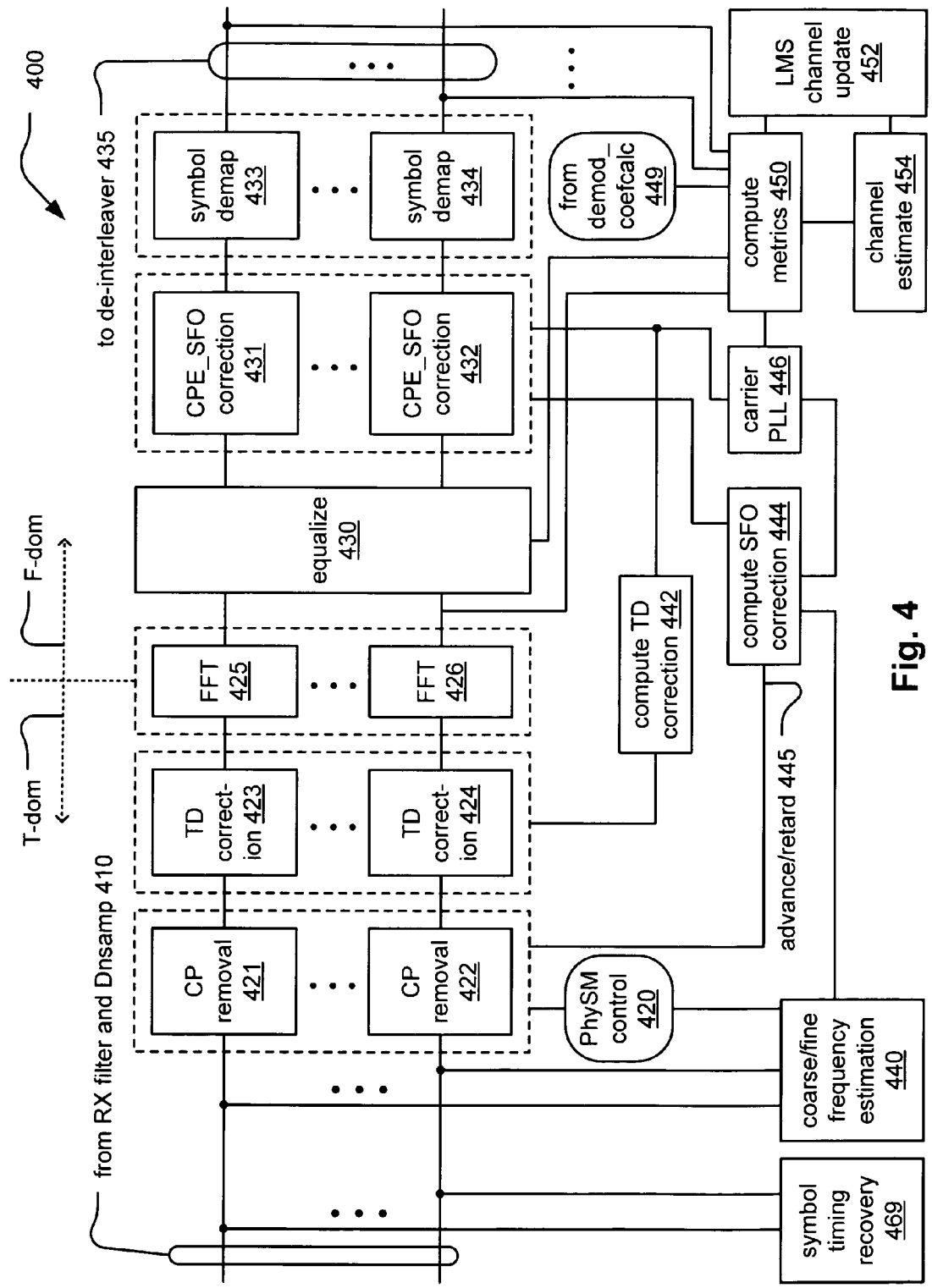
FIG. 4 is a diagram of feedback control within a communication device.

FIG. 4 is a diagram of feedback control 400 within a communication device. Initially, a plurality of signals, indicated by reference numeral 410, is received after undergoing receive filtering and down sampling. Such initial processing as receive filtering and down sampling may be viewed as being performed within an AFE (Analog Front End) of a communication device. In some embodiments, the feedback control 400 may be viewed may be viewed as being performed in a baseband processing module as depicted in some other of the embodiments disclosed herein.

Within this feedback control 400, a symbol timing recovery module 469 is operable to perform symbol timing recovery in accordance with any one of the various embodiments or equivalents described herein. Also, within this feedback control 400, a coarse/fine frequency estimation module 440 is operable to perform initially coarse frequency estimation and then subsequently fine frequency estimation as governed by PHY (physical layer) control, as indicated by PhySM control input 420.

Also within this feedback control 400, cyclic prefix (CP) removal of this incoming signal streams may be performed as shown by the CP removal modules 421-422; the operation of these CP modules 421-422 is also governed by PHY control, as indicated by PhySM control input 420. The CP removal functionality is based on an advance/retard signal 445 provided from a compute SFO (Sampling Frequency Offset) correction module 444 that operates using inputs received from a carrier PLL (Phase Locked Loop) 446 and the coarse/fine frequency estimation module 440.

Thereafter, predictive time-domain (TD) PLL correction is computed using a plurality of TD correction modules 423-424 (based on signals received from the carrier PLL 446 that correspond to a previous plurality of received symbols (e.g., previous N–$1^{st}$ symbol in one embodiment)). These outputs from the TD correction modules 423-424 are then passed to a plurality of FFT (Fast Fourier Transform) modules 425-426. These FFT modules 425-426 operate to transform the signal processing from the time domain (T-dom) to the frequency domain (F-dom). An equalize module 430 is operable to perform equalization on the signals received from the FFT modules 425-426. The equalize module 430 may be viewed as performing essentially a channel inversion operation on the signals received from the FFT modules 425-426 in an effort to compensate for, at least in part, the imperfections and deleterious characteristics of the communication channel over which a signal has been transmitted and from which the signal has been received. During a first instance, this equalize module 430 may be viewed as performed a $1^{st}$ pass of equalization, in that, the equalize processing may be viewed as being an iterative type process that compensates for any channel induced errors.

After this, these equalized signal streams are passed to a plurality of CPE_SFO correction modules 431-432 that is operable to apply predictive SFO correction that has been computed using a previous plurality of symbols (e.g., previous n–$1^{st}$ symbol in one embodiment) while also considering common phase error (CPE) correction values. The CPE_SFO correction modules 431-432 receive input signals from both the compute SFO correction module 444 as well as the carrier PLL 446. In an initial pass through the, the CPE correction value may be set to a phase of 0 (zero). The streams output from the CPE_SFO correction modules 431-432 are then provide to a plurality of symbol demap modules 433-434 that is operable to perform the appropriate symbol demapping of each of the symbols of these sequences of discrete values modulation symbols according to the appropriate modulation types (i.e., each modulation type includes a constellation shape and a corresponding mapping).

A compute metrics module 450 is operable to compute the CPE correction values. These CPE correction values are then filtered by the carrier PLL 446 before being provided to the CPE_SFO correction modules 431-432. A compute TD correction module 442 then computes the TD PLL correction from the current symbol (e.g., the $n^{th}$ symbol) for use with respect to the next symbol (e.g., n+$1^{st}$ symbol). The compute SFO correction module 444 then computes the SFO correction from the current symbol (e.g., the nth symbol) for use with respect to the next symbol (e.g., n+$1^{st}$ symbol). The equalize module 430 is then also adjusted using the SFO correction values that have been calculated using the compute metrics module 450.

The same SFO correction values computed and applied for the predictive SFO correction employed above as applied in conjunction with the CPE correction values from the current symbol (e.g., the $n^{th}$ symbol). In this pass of the feedback control processing, the CPE correction has the current symbol phase estimate that has been calculated as described above. The plurality of symbol demap modules 433-434 is then operable to perform the appropriate symbol demapping of each of the symbols again. After this step, an LMS channel update module 452 is then operable to compute the LMS (Least Means Square) channel update error terms for use by the next symbol (e.g., n+$1^{st}$ symbol). The LMS channel update module 452 then is operable to provide updated channel information to a channel estimate module 454 for processing the next symbol (e.g., n+1$^{st}$ symbol).

The compute metrics module 450 is operable to perform a variety of functions. The compute metrics module 450 is operable to compute the angular phase error, θ(est) or $\hat{\theta}$, between the outputs of the equalize module 430 and the expected constellation points of the expected modulation (having the expected constellation shape and corresponding mapping). This is employed by the carrier PLL 446 for CFO/SFO tracking by each of the corresponding appropriate modules.

The compute metrics module 450 is also operable to compute the error, $\Delta H_k$, between a received vector and an expected vector based on an expected constellation point. This is employed by the LMS channel update module 452.

The compute metrics module 450 is also operable to determine a signal type (shown by sig_type) that indicates the modulation type of the SIG field as is known within an OFDM packet employed in accordance with IEEE 802.11n.

The compute metrics module also receives the appropriate 1 or more coefficients are received as shown by reference numeral 449 that are employed to calculate the location of the expected modulation (constellation and mapping) to which the received signal is symbol demapped. These may be provided via the signal, indicated by reference numeral 449, that operates by receiving coefficients from a demod_coefcalc module.

It is noted that the feedback control 400 within a communication device may be viewed as being implemented within a communication system operating using OFDM (Orthogonal Frequency Division Multiplexing) signaling.

Several of the following embodiments are directed towards performing carrier detection when processing an OFDM packet that is processed from a signal that has been received from a communication channel. The carrier detection functionality and methods presented herein are applicable to any of a variety of communication systems including those having more than one receive stream. Generally speaking, these carrier detection functionality and methods may be applied to any received signal.

Figure 5:
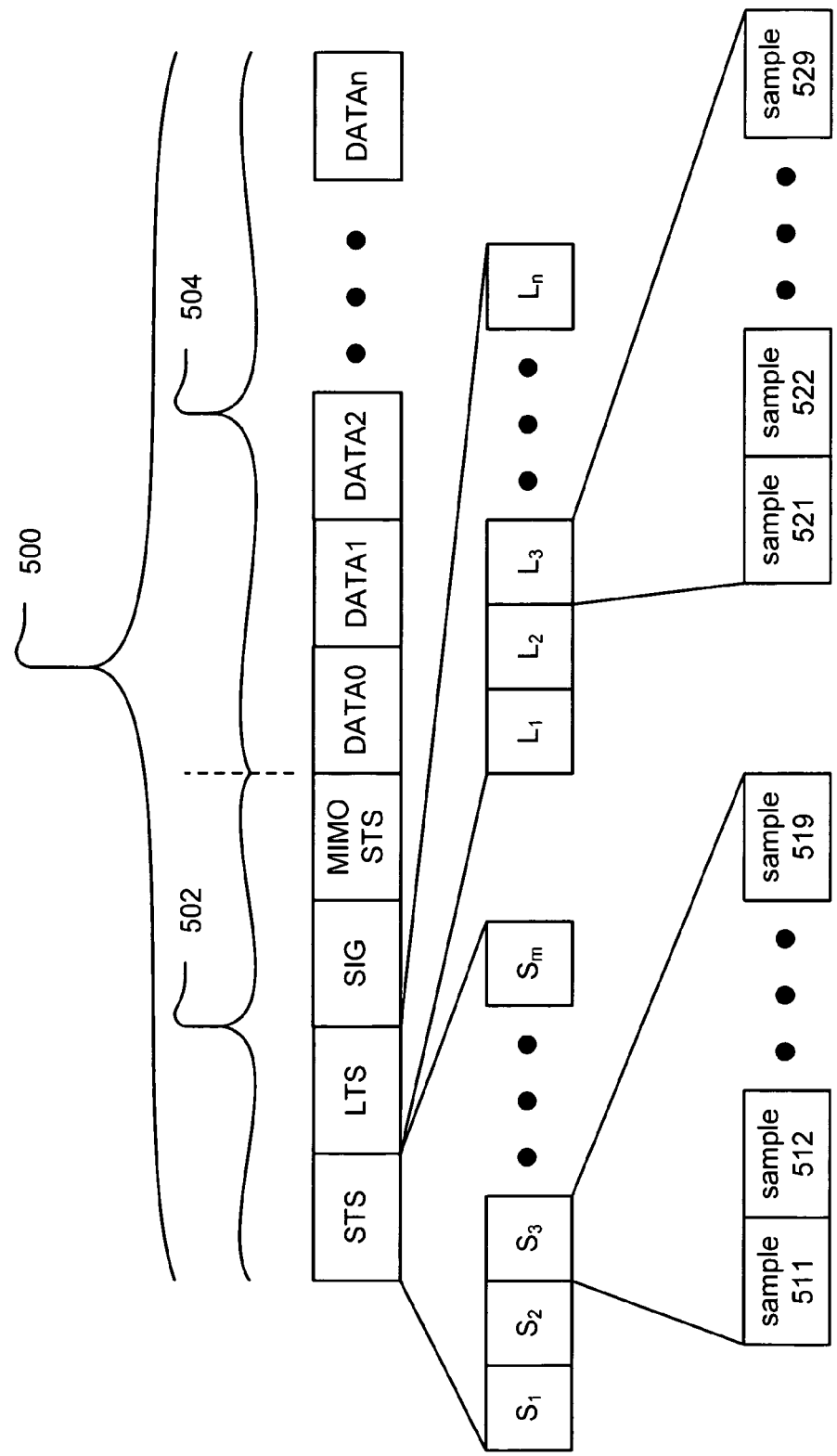
FIG. 5 is a diagram illustrating an embodiment of an OFDM (Orthogonal Frequency Division Multiplexing) packet that may be processed.

FIG. 5 is a diagram illustrating an embodiment of an OFDM (Orthogonal Frequency Division Multiplexing) packet 500 that may be processed.

The OFDM packet 500 may be viewed as including a preamble portion 502 and a data portion 504. The leftmost portion of the OFDM packet 500 is the demarcation of the start of packet (SOP) and the rightmost portion of the OFDM packet 500 is the demarcation of the end-of-packet (EOP). The preamble portion 502 of the OFDM packet 500 is relatively short in time compared to the overall packet length of the OFDM packet 500, and corrections and calculations for other system impairments such as carrier frequency detect, carrier recovery, timing recovery, CFO (Carrier Frequency Offset), and others may also need to be calculated during this portion of the transmission. Thus, the amount of time needed to determine such parameters for a received OFDM packet 500 needs to be kept small.

The preamble portion 502 may be divided into several training sequences. For example, first a short training sequence (STS) may be received. This is followed by a long training sequence (LTS), signal field (SIG), and an additional short training sequence (MIMO STS). The SIG portion of the preamble may describe the content of data with information provided in a predetermined format.

It is also noted here that the preamble portion 502 may include a wide variety of combinations of STSs, LTSs, and SIGs. In addition, the order of each of these various types of training sequences (STSs, LTSs, and SIGs) may be in any desired order within the preamble portion 502. The particular arrangement of the preamble portion 502 within this diagram is illustrative of just one possible embodiment. Clearly, variations thereof may be implemented without departing from the scope and spirit of the invention.

In the context of timing recovery functionality and method implemented to perform such functionality, the operation and processing may be performed on the STS. Each of the portions of the OFDM packet 500 may be viewed as including more than 1 OFDM symbol. For example, the STS of the preamble portion 502 of the OFDM packet 500 may include a plurality of OFDM symbols, shown as $S_1, S_2, S_3, \ldots, S_m$. Clearly, the STS could possibly include as few as 2 OFDM symbols in some embodiments. The LTS of the preamble portion 502 of the OFDM packet 500 may also include a plurality of OFDM symbols, shown as $L_1, L_2, L_3, \ldots, L_n$. Clearly, the LTS also could possibly include as few as 2 OFDM symbols in some embodiments.

Each of the OFDM symbols comprises a plurality of samples. For example, the OFDM symbol S2 includes sample 511, sample 512, and . . . , sample 519. As another example, the OFDM symbol $L_3$ includes sample 521, sample 522, and . . . , sample 529. Clearly, this relationship may also be applicable for other of the OFDM symbols as well, in that, each OFDM symbol includes a corresponding plurality of samples, and the total number of samples within each of these symbols may not be identical.

Figure 6:
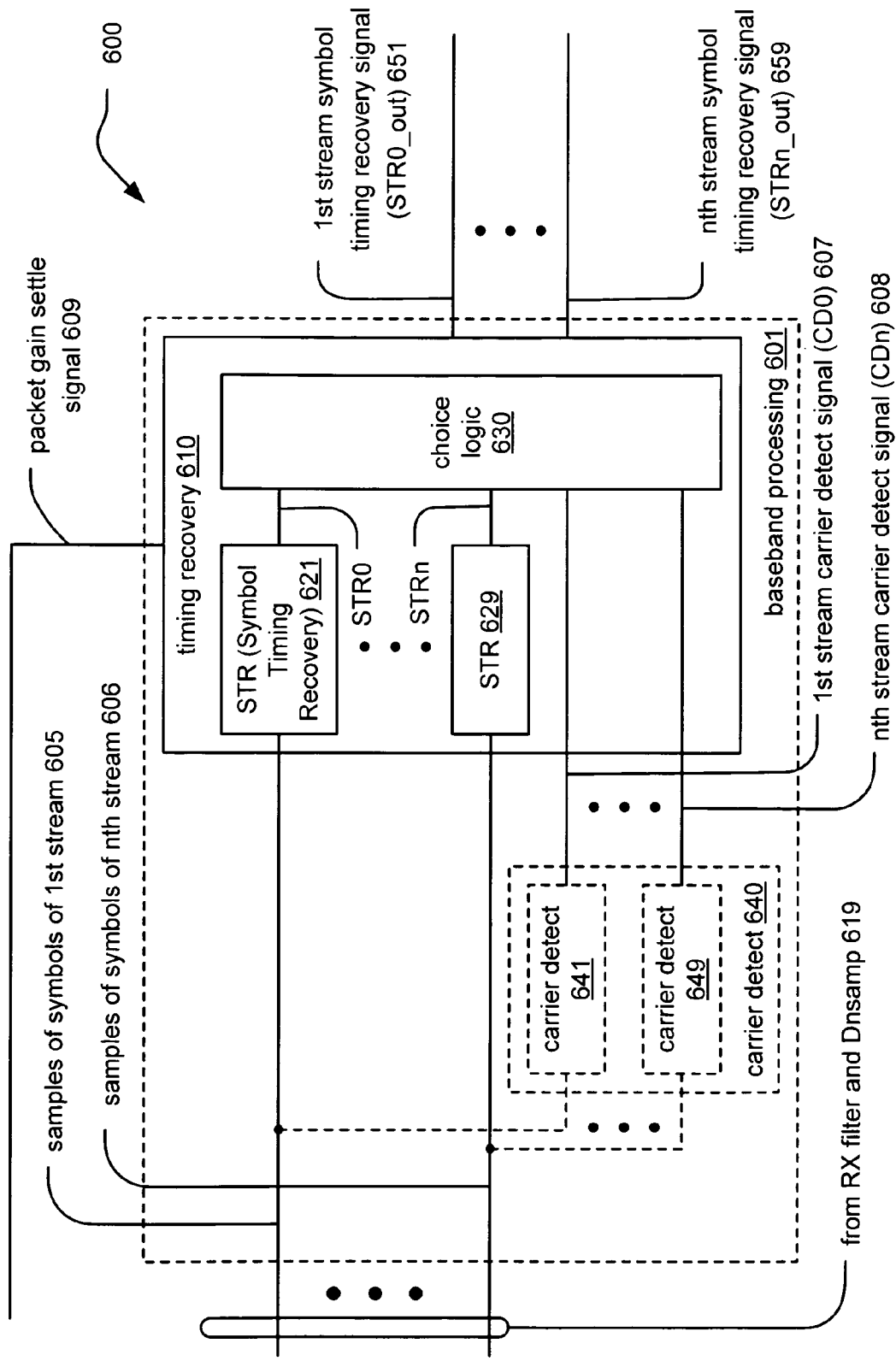
FIG. 6 is a diagram illustrating an embodiment of functionality operable to perform timing recovery.

FIG. 6 is a diagram illustrating an embodiment of functionality 600 operable to perform timing recovery. This embodiment shows a very generic embodiment by which a timing recovery module 610 may be implemented. In some desired embodiments, the timing recovery module 610 may be implemented within a baseband processing module 601. This baseband processing module 601 may be the baseband processing module 100 shown above within other embodiments, or the baseband processing module 601 may include different functionality and capabilities as the baseband processing module 100 shown above.

This embodiment shows the receiving of multiple streams that may corresponds to a plurality of antennae within a communication device. For example, each of the streams 1, . . . , n can correspond to a particular antenna within the communication device (e.g., the communication device includes n antennae). Initially, a plurality of signals, indicated by reference numeral 619, is received after undergoing receive filtering and down sampling. Such initial processing as receive filtering and down sampling may be viewed as being performed within an AFE (Analog Front End) of a communication device.

The samples of symbols of a 1$^{st}$ stream 605 are provided to a first STR (Symbol Timing Recovery) module 621. Analogously, the samples of symbols of an n$^{th}$ stream 606 are provided to an n$^{th}$ STR module 629. Each of these STR modules is operable to perform processing of its corresponding received samples of symbols of its corresponding stream to generate a symbol timing recovery signal. For example, the first STR module 621 generates a 1$^{st}$ symbol timing recovery signal (e.g., STR0), . . . , and the n$^{th}$ STR module 629 generates an n$^{th}$ symbol timing recovery signal (e.g., STRn). All of these symbol timing recovery signals are provided to a choice logic module 630 implemented within the timing recovery module 610. Each of the symbol timing recovery signals indicates whether or not symbol timing recovery has been in fact performed for that corresponding stream.

In some embodiments, the samples of symbols of a $1^{st}$ stream 605 and the samples of symbols of an $n^{th}$ stream 606 are provided to a carrier detect module 640 that is operable to generate a corresponding plurality of carrier detect signals for each of the receive streams. The carrier detect module 640 may be partitioned to include one carrier detect module for each of the receive streams (e.g., carrier detect module 641 for performed carrier detection on the samples of symbols of a $1^{st}$ stream 605, . . . and a carrier detect module 649 for performed carrier detection on the samples of symbols of an $n^{th}$ stream 606. Each of these corresponding plurality of carrier detect signals is provided to the choice logic module 630 implemented within the timing recovery module 610. For example, the carrier detect module 640 (or the carrier detect module 641) provides a $1^{st}$ stream carrier detect signal (e.g., CD0) 607 to the choice logic module 630, . . . , and the carrier detect module 640 (or the carrier detect module 649) provides an $n^{th}$ stream carrier detect signal (e.g., CDn) 608 to the choice logic module 630.

In some embodiments, the choice logic module 630 is operable to receive all of these symbol timing recovery signals at approximately the same time as the choice logic module 630 receives the carrier detect signals. Generally speaking, the generation of the symbol timing recovery signals by each of the STR modules may be performed in parallel as the generation of the carrier detect signals by each of the carrier detect modules in a particular communication device.

The timing recovery module 610 also receives a packet gain settle signal 609 that indicates whether or not the communication device is operating according to steady-state operating conditions. For example, it is not uncommon for various portions of a communication device to undergo modification (e.g., gain control) to accommodate and process received signals. Sometime, when switching between various settings within other portions of the communication device (e.g. within an AFE (Analog Front End)), undesirable transients may propagate through the communication device. This packet gain settle signal 609 provides indicia as to whether any modifications that have been made within the communication device are completed and the operation of the communication device is settled down to a sufficient degree as not to perturb the processing being performed by the timing recovery module 610.

The choice logic module 630 is operable to receive each of the symbol timing recovery signals corresponding to the multiple streams as well as the carrier detect signals corresponding to the multiple streams. By considering all of these received signals, the choice logic module 630 is operable to select one of the symbol timing recovery signals or a non-symbol timing recovery signal for each of the streams. In some instances, the choice logic module 630 is operable to select a symbol timing recovery signal corresponding to one of the streams to be used as the symbol timing recovery signal for another of the streams. In other words, the symbol timing recovery signal corresponding to a particular stream is not always selected as the symbol timing recovery signal for that particular stream.

The choice logic module 630 of the timing recovery module 610 is operable to output a $1^{st}$ stream symbol timing recovery signal (STR0_out) 651, . . . , and $n^{th}$ stream symbol timing recovery signal (STRn_out) 659. The timing recovery module 610 is operable to provide either an actual symbol timing recovery signal or a non-symbol timing recovery signal for each of the streams.

Figure 7:
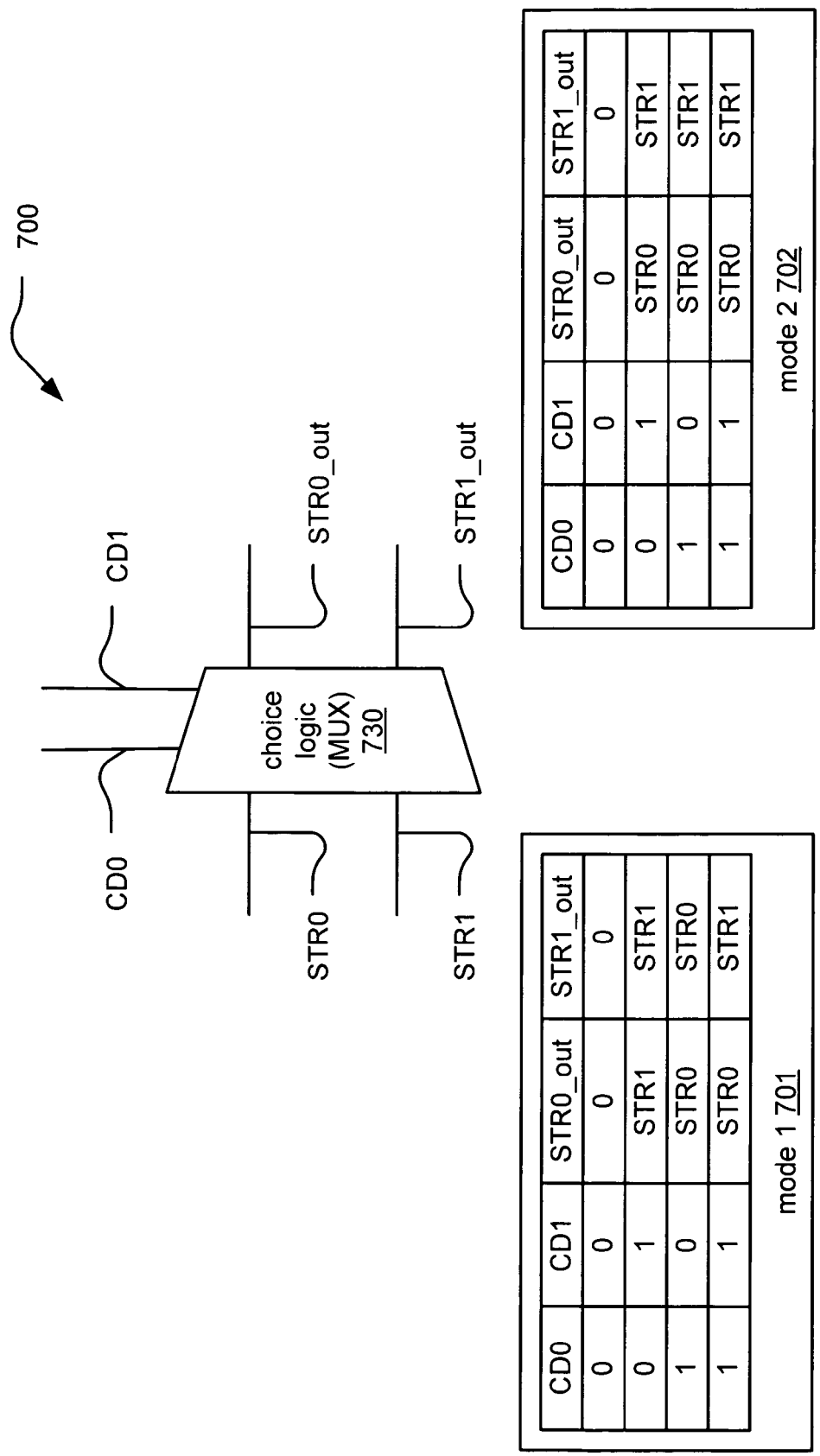
FIG. 7 is a diagram illustrating an embodiment of choice logic functionality employed when performed timing recovery.

FIG. 7 is a diagram illustrating an embodiment 700 of choice logic functionality employed when performed timing recovery. In this embodiment, the choice logic functionality is implemented as a MUX (Multiplexor) (i.e., choice logic MUX 730). This embodiment is shown as receiving and operating on two streams, but this could clearly be extended up to a larger plurality of streams as well. The inputs to the choice logic MUX 730 are a $1^{st}$ symbol timing recovery signal (STR0) and a $2^{nd}$ symbol timing recovery signal (STR1), and the select signals for the choice logic MUX 730 are a $1^{st}$ carrier detect signal (CD0) and a $2^{nd}$ carrier detect signal (CD1). There are at least 2 modes of operation by which the choice logic MUX 730 may operate to output symbol timing recovery signals for each of these two streams (e.g., STR0_out for the $1^{st}$ stream and STR1_out for the $2^{nd}$ stream).

A table indicating mode 1 of operation (shown by reference numeral 701) is provided below.

| Mode 1 701 | | | |
|---|---|---|---|
| CD0 | CD1 | STR0_out | STR1_out |
| 0 | 0 | 0 (none) | 0 (none) |
| 0 | 1 | STR1 | STR1 |
| 1 | 0 | STR0 | STR0 |
| 1 | 1 | STR0 | STR1 |

This mode 1 701 of operation provides a non-symbol timing recovery signal for each of the streams when each of the streams receives a carrier detect signal that indicates that no carrier detection has been made (this is shown above as 0 (none)). In this mode 1 701, when only one of the carrier detect signals indicates that carrier detection has been successful (and the other carrier detect signal indicates no carrier detect), then the symbol timing recovery signal corresponding to the stream that has successful carrier detection is employed as the symbol timing recovery signal for both of the streams. In addition, in this mode 1 701, when both of the carrier detect signals indicate that carrier detection has been successful, then the symbol timing recovery signal corresponding to each of the streams is employed as the symbol timing recovery signal for that corresponding stream.

A table indicating mode 2 of operation (shown by reference numeral 702) is provided below.

| Mode 2 702 | | | |
|---|---|---|---|
| CD0 | CD1 | STR0_out | STR1_out |
| 0 | 0 | 0 (none) | 0 (none) |
| 0 | 1 | STR0 | STR1 |
| 1 | 0 | STR0 | STR1 |
| 1 | 1 | STR0 | STR1 |

This mode 2 702 of operation also provides a non-symbol timing recovery signal for each of the streams when each of the streams receives a carrier detect signal that indicates that no carrier detection has been made (this is shown above as 0 (none)). In this mode 2 702, when only one of the carrier detect signals indicates that carrier detection has been successful (and the other carrier detect signal indicates no carrier detect), then the then the symbol timing recovery signal corresponding to each of the streams is employed as the symbol timing recovery signal for that corresponding stream. This may be viewed as being based on the supposition that each of the symbol timing recovery signals is in fact accurate when carrier detection has been successful on at least one of the streams. In addition, in this mode 2 702, when both of the carrier detect signals indicate that carrier detection has been successful, then the symbol timing recovery signal corresponding to each of the stream is employed as the symbol timing recovery signal for that corresponding stream (this is similar to the mode 1 701).

Clearly, while this embodiment 700 of choice logic functionality has been illustrated to show processing and operation on two streams, these principles may be extended to operate on higher numbers of streams as well without departing from the scope and spirit of the invention.

Figure 8:
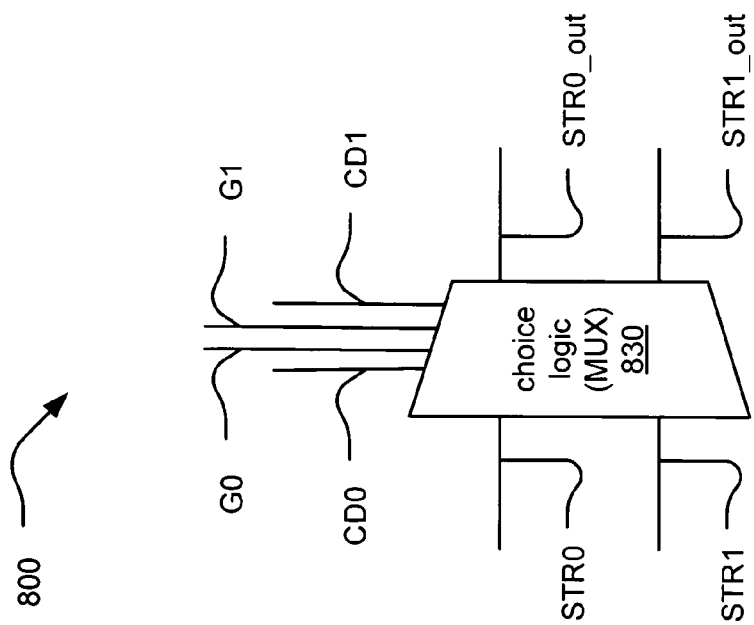
FIG. 8 is a diagram illustrating another embodiment of choice logic functionality employed when performed timing recovery.

FIG. 8 is a diagram illustrating another embodiment 800 of choice logic functionality employed when performed timing recovery. In this embodiment, the choice logic functionality is implemented as a MUX (Multiplexor) (i.e., choice logic MUX 830). This embodiment is shown as receiving and operating on two streams, but this could clearly be extended up to a larger plurality of streams as well. The inputs to the choice logic MUX 830 are a $1^{st}$ symbol timing recovery signal (STR0) and a $2^{nd}$ symbol timing recovery signal (STR1), and the select signals for the choice logic MUX 830 are a $1^{st}$ carrier detect signal (CD0), a $2^{nd}$ carrier detect signal (CD1), a $1^{st}$ packet gain settle signal (G0), and a $2^{nd}$ packet gain settle signal (G1). In instances where carrier detection is performed relatively late, then the packet gain may not have settled yet (e.g., after having undergone a change, it may still be undergoing some transient type behavior). In each of these embodiments, if carrier detect has not been successful, then regardless of what the gain is, no symbol timing recovery signal is generated. In other words, before an accurate symbol timing recovery signal can be generated, it is highly desirable that the packet gain has settled.

There are at least 3 modes of operation by which the choice logic MUX 830 may operate to output symbol timing recovery signals for each of these two streams (e.g., STR0_out for the $1^{st}$ stream and STR1_out for the $2^{nd}$ stream). Each of these modes considers, at least in part, one or both of the $1^{st}$ packet gain settle signal (G0) and the $2^{nd}$ packet gain settle signal (G1).

A table indicating mode 3 of operation (shown by reference numeral 803), corresponds to the cases where the $1^{st}$ packet gain settle signal (G0) is less than the $2^{nd}$ packet gain settle signal (G1) (i.e., G1<G1). The Table is provided below.

| (G0 < G1) Mode 3 803 | | | |
|---|---|---|---|
| CD0 | CD1 | STR0_out | STR1_out |
| 0 | 0 | 0 (none) | 0 (none) |
| 0 | 1 | STR0 | STR0 |
| 1 | 0 | STR0 | STR0 |
| 1 | 1 | STR0 | STR0 |

This mode 3 803 of operation provides a non-symbol timing recovery signal for each of the streams when each of the streams receives a carrier detect signal that indicates that no carrier detection has been made (this is shown above as 0 (none)). In this mode 3 803, when $1^{st}$ packet gain settle signal (G0) is less than the $2^{nd}$ packet gain settle signal (G1) (i.e., G1<G1), then when either one or both of the carrier detect signals indicate that carrier detection has been successful, then the symbol timing recovery signal corresponding to the $1^{st}$ stream (STR0) is employed as the symbol timing recovery signal for both of the streams.

A table indicating mode 4 of operation (shown by reference numeral 804), corresponds to the cases where the $1^{st}$ packet gain settle signal (G0) is more than the $2^{nd}$ packet gain settle signal (G1) (i.e., G0<G1). The Table is provided below.

| (G0 > G1) Mode 4 804 | | | |
|---|---|---|---|
| CD0 | CD1 | STR0_out | STR1_out |
| 0 | 0 | 0 (none) | 0 (none) |
| 0 | 1 | STR1 | STR1 |
| 1 | 0 | STR1 | STR1 |
| 1 | 1 | STR1 | STR1 |

This mode 4 804 of operation provides a non-symbol timing recovery signal for each of the streams when each of the streams receives a carrier detect signal that indicates that no carrier detection has been made (this is shown above as 0 (none)). In this mode 4 804, when $1^{st}$ packet gain settle signal (G0) is more than the $2^{nd}$ packet gain settle signal (G1) (i.e., G0>G1), then when either one or both of the carrier detect signals indicate that carrier detection has been successful, then the symbol timing recovery signal corresponding to the $2^{nd}$ stream (STR1) is employed as the symbol timing recovery signal for both of the streams.

A table indicating mode 5 of operation (shown by reference numeral 805), corresponds to the cases where the $1^{st}$ packet gain settle signal (G0) is approximately equal to the $2^{nd}$ packet gain settle signal (G1) within some desired threshold (i.e., G0≈G1). The Table is provided below.

| (G0 ≈ G1) Mode 5 805 | | | |
|---|---|---|---|
| CD0 | CD1 | STR0_out | STR1_out |
| 0 | 0 | 0 (none) | 0 (none) |
| 0 | 1 | STR0 | STR1 |
| 1 | 0 | STR0 | STR1 |
| 1 | 1 | STR0 | STR1 |

This mode 4 804 of operation provides a non-symbol timing recovery signal for each of the streams when each of the streams receives a carrier detect signal that indicates that no carrier detection has been made (this is shown above as 0 (none)). In this mode 5 805, when $1^{st}$ packet gain settle signal (G0) is approximately equal to the $2^{nd}$ packet gain settle signal (G1) (i.e., G0≈G1), when only one of the carrier detect signals indicates that carrier detection has been successful (and the other carrier detect signal indicates no carrier detect), then the then the symbol timing recovery signal corresponding to each of the streams is employed as the symbol timing recovery signal for that corresponding stream. This may be viewed as being based on the supposition that each of the symbol timing recovery signals is in fact accurate when carrier detection has been successful on at least one of the streams. In addition, in this mode 5 805, when both of the carrier detect signals indicate that carrier detection has been successful, then the symbol timing recovery signal corresponding to each of the stream is employed as the symbol timing recovery signal for that corresponding stream.

Figure 9:
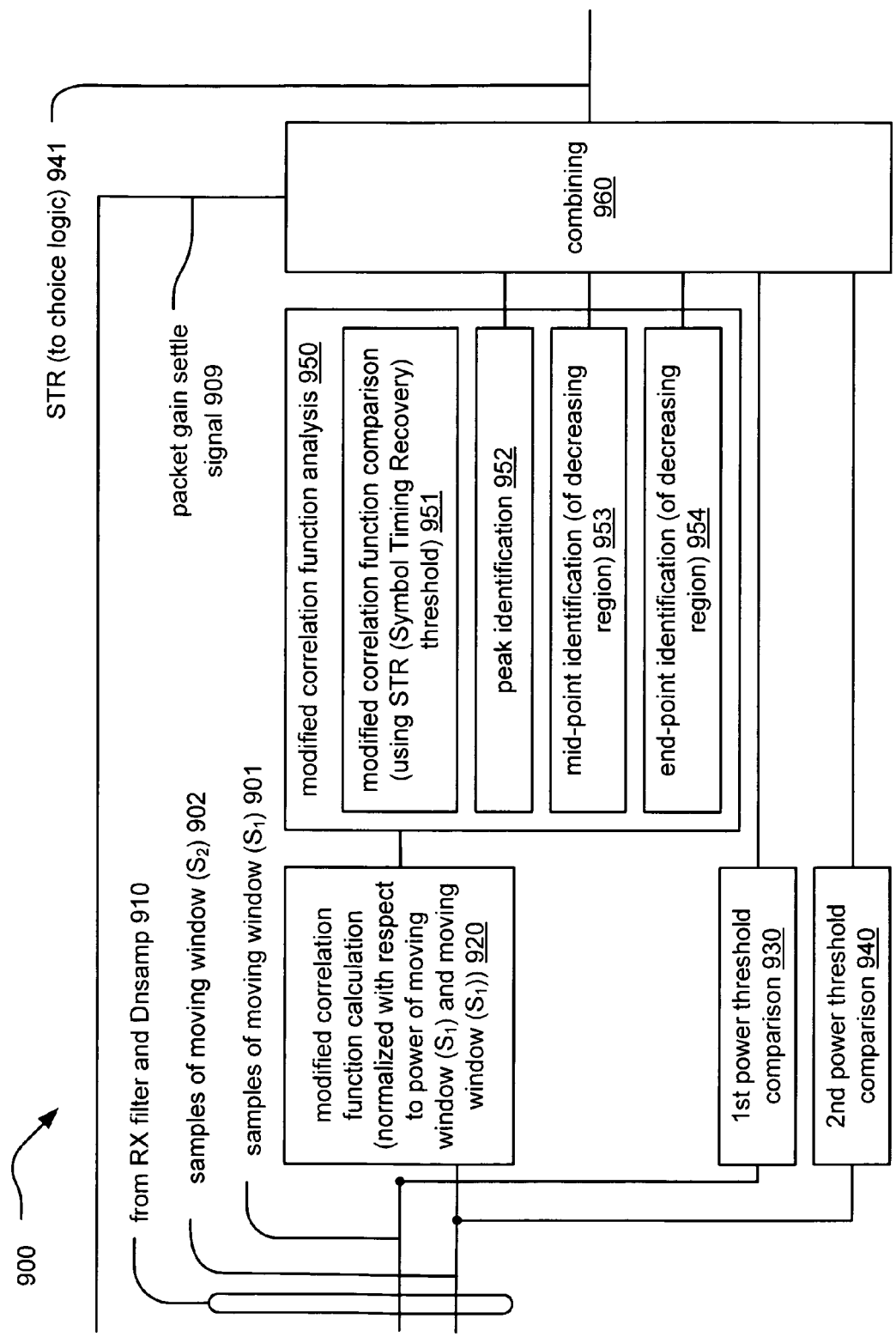
FIG. 9 is a diagram illustrating an embodiment of functionality operable to support symbol timing recovery processing.

FIG. 9 is a diagram illustrating an embodiment of functionality 900 operable to support symbol timing recovery processing. Modified correlation function calculation 920 is performed when operating on the samples of two moving windows of an OFDM packet (e.g., as indicated by samples of moving window ($S_1$) 901 and samples of moving window ($S_2$) 902, respectively) that are processed and received after undergoing receive filtering and down sampling, as indicated by reference numeral 910. Such initial processing as receive filtering and down sampling may be viewed as being performed within an AFE (Analog Front End) of a communication device.

Each of these streams can be viewed as being one of any number of streams within a communication device for which timing recovery processing is being performed. Clearly, more than 2 streams can be employed in a particular embodiment.

For example, the samples of moving window ($S_1$) 901 and samples of moving window ($S_2$) 902 may be viewed as being successive symbols within an OFDM packet. These 2 symbols may both be located within an STS of an OFDM packet. Alternatively, these 2 symbols may both be located within an LTS of an OFDM packet. In even another instance, 1 of these 2 symbols may both be located within an STS of an OFDM packet, and the other 1 of these 2 symbols may both be located within an LTS of an OFDM packet (i.e., 1 symbol in the STS, and 1 symbol in the LTS). This modified correlation function calculation 920 is then performed using the samples of moving window ($S_1$) 901 and samples of moving window ($S_2$) 902.

This modified correlation function calculation 920 differs from straight-forward auto-correlation function calculation, in that, the term is normalized with respect to the power of each of the moving windows of each of the samples of window 1 901 and the samples of window 2 902.

A strict auto-correlation function calculation, $\rho_{corr}$, of using the samples of moving window ($S_1$) 901 and samples of moving window ($S_2$) 902, would be performed as follows:

$$\rho_{corr} = \frac{E[S_1, S_2^*]}{\sqrt{P_{S_1}} \cdot \sqrt{P_{S_2}}} - m_{S_1} \cdot m_{S_2},$$

where:

$E[S_1, S_2^*]$ is the expected value when considering the samples of moving window ($S_1$) 901 and samples of moving window ($S_2$) 902;

$m_{S_1}$ is the mean value of the samples of moving window ($S_1$) 901;

$m_{S_2}$ is the mean value of the samples of moving window ($S_2$) 902;

$P_{S_1}$ is the power of the samples of moving window ($S_1$) 901; and $P_{S_2}$ is the power of the samples of moving window ($S_2$) 902.

It is noted that $E[S_1, S_2^*]$ is calculated as a function of each of the samples of moving window ($S_1$) 901 and the samples of moving window ($S_2$) 902. For example, assuming the samples of $S_1$ includes n samples as $x_1, x_2, \ldots, x_n$, and the samples of $S_2$ includes n samples as $y_1, y_2, \ldots, y_n$, then the term, $E[S_1, S_2^*]$, is calculated as follows:

$$E[S_1, S_2^*] = \frac{x_1 y_1^* + x_2 y_2^* + \cdots x_n y_n^*}{n}.$$

For comparison, the covariance function calculation, $\rho_{cov}$, of using the samples of moving window ($S_1$) 901 and the samples of moving window ($S_2$) 902, would be performed as follows:

$$\rho_{cov} = \frac{E[S_1, S_2^*] - m_{S_1} \cdot m_{S_2}}{\sigma_{S_1} \cdot \sigma_{S_2}},$$

where:

$\rho_{S_1}$ is the standard deviation of the noise of the samples of moving window ($S_1$) 901; and $\rho_{S_2}$ is the standard deviation of the noise of the samples of moving window ($S_2$) 902.

However, the modified correlation function calculation 920 (which is performed for every sample of each of the moving windows as depicted using, $S_1$ and $S_2$) is instead calculated as follows:

$$\rho_{mod\_corr} = \frac{E[S_1, S_2^*] - m_{S_1} \cdot m_{S_2}}{\sqrt{P_{S_1}} \cdot \sqrt{P_{S_2}}},$$

or alternatively after being squared as follows:

$$\rho_{mod\_corr}^2 = \frac{(E[S_1, S_2^*] - m_{S_1} \cdot m_{S_2})^2}{P_{S_1} \cdot P_{S_2}}.$$

As can be seen, the modified correlation function calculation 920 is normalized with respect to the power of each of the samples of moving window ($S_1$) 901 and samples of moving window ($S_2$) 902. This generally results in a smaller value than would either of the strict auto-correlation function calculation, $\rho_{corr}$, or the covariance function calculation, $\rho_{cov}$, thereby providing for less susceptibility to false carrier detects. By generating a smaller number, a carrier signal is a bit more difficult to detect, but this will provide for a more robust approach that reduces false carrier detects while also providing a very accurate carrier detect signal indicating that a carried signal is in fact detected (or sensed). Generally speaking, as the power of each of the samples of moving window ($S_1$) 901 and samples of moving window ($S_2$) 902, decreases, then the values of the modified correlation function increases.

The modified correlation function is monitored over a predetermined number of samples, and the modified correlation function is compared to a modified correlation function threshold as shown in a block 950. Typically, when the samples of moving window ($S_1$) 901 and samples of moving window ($S_2$) 902, are correlated, then the modified correlation function climbs to reach a peak and then decreases over a region before climbing again to a subsequent peak.

A designer is given great flexibility in how to implement these the criterion or criteria required to be met before declaring that carrier detect has been performed. For example, any of the thresholds employed herein can be modified. In some instances, the thresholds can be lowered when accompanied with requiring more consecutive peaks be detected within the modified correlation function threshold.

Once the modified correlation function has been (and continues to be) calculated for the samples of the various symbols of the stream containing this OFDM packet, modified correlation function analysis is performed, as shown in a block 950.

As shown in a block 951, the modified correlation function is compared to a symbol timing recovery threshold (e.g., Th$_{STR}$). Also, as shown in a block 952, a peak value (or a starting value) of the modified correlation function is identified (e.g., $\rho_{AC\_start}^2(n_{AC\_start})$). This peak value (or starting value) (e.g., $\rho2_{AC\_start}^2(n_{AC\_start})$) is identified when the modified correlation function exceeds the symbol timing recovery threshold (e.g., Th$_{STR}$) and when the modified correlation function is substantially non-increasing. It is noted that the modified correlation function need not necessarily be decreasing; if the modified correlation function is flat (e.g., neither increasing nor decreasing), this is sufficient to meet the criterion of this parameter.

As shown in a block 953, over a region which it is determined that the modified correlation function is in fact decreasing, a mid-point of the decreasing region of the modified correlation function is identified that, when biased by a predetermined amount, is less than the peak value of the modified correlation function. This mid-point is really a mid-point that is biased by a certain degree; this may be viewed as being performed to ensure that the mid-point is sufficiently less than the peak value (or starting value) (e.g., $\rho2_{AC\_start}^2(n_{AC\_start})$). This could be expressed mathematically as follows:

$$(\rho2_{AC\_mp}^2(n_{AC\_mp})+\text{bias}) < \rho_{AC\_start}^2(n_{AC\_start}),$$
where:

$\rho_{AC\_start}^2(n_{AC\_start})$ is the modified correlation function at this peak value (or starting value) which is located as sample, $n_{AC\_start}$;

$\rho_{AC\_mp}^2(n_{AC\_mp})$ is the modified correlation function at this mid-point value which is located as sample, $n_{AC\_mp}$; and bias is an offset bias value selected by a designer.

As shown in a block 954, an end-point of the decreasing region of the modified correlation function is identified that, when scaled by a predetermined scaling factor, is less than the peak value (or starting value) (e.g., $\rho_{AC\_start}^2(n_{AC\_start})$) of the modified correlation function. This could be expressed mathematically as follows:

$$(k \cdot \rho_{AC\_ep}^2(n_{AC\_ep})) < \rho_{AC\_start}^2(n_{AC\_start}), \text{where:}$$

$\rho2_{AC\_start}^2(n_{AC\_start})$ is the modified correlation function at this peak value (or starting value) which is located as sample, $n_{AC\_start}$;

$\rho_{AC\_ep}^2(n_{AC\_ep})$ is the modified correlation function at this end-point value which is located as sample, $n_{AC\_ep}$;

k is a scaling factor selected by a designer.

It is noted that each of the processing operations performed within the various sub-blocks within the modified correlation function analysis 950 may be considered to determine the rate of fall of the modified correlation function over this decreasing region.

Also, this embodiments shows how the power of each of the samples of moving window (S$_1$) 901 and samples of moving window (S$_2$) 902, undergoes power comparison. Specifically, the power of the samples of moving window (S$_1$) 901, is compared to a 1$^{st}$ power threshold as shown in a block 930; this comparison of the power of the symbol, S$_1$, is with respect to a 1$^{st}$ power threshold. The power of the samples of moving window (S$_2$) 902, is compared to a 2$^{nd}$ power threshold as shown in a block 940; this comparison of the power of samples of moving window (S$_2$) 902, is with respect to a 2$^{nd}$ power threshold. In some embodiments, these power thresholds are the same; in other embodiments, they may be different.

The outputs of each of these blocks 950, 930, and 940 are provided to a combining module 960. The combining module 960 may be viewed as performing the processing of each of the comparisons being performed in the blocks 950, 930, and 940 to determine whether or not a signal timing recovery signal (STR) 941 indicates that symbol timing recovery has been successful or not. This signal timing recovery signal (STR) 941 is then provided to a choice logic module.

The combining module 960 also receives a packet gain settle signal 909 that indicates whether or not the communication device is operating according to steady-state operating conditions. For example, it is not uncommon for various portions of a communication device to undergo modification (e.g., gain control) to accommodate and process received signals. Sometime, when switching between various settings within other portions of the communication device (e.g. within an AFE (Analog Front End)), undesirable transients may propagate through the communication device. This packet gain settle signal 909 provides indicia as to whether any modifications that have been made within the communication device are completed and the operation of the communication device is settled down to a sufficient degree as not to perturb the processing being performed by the combining module 960.

In one possible embodiment, the signal timing recovery signal (STR) 941 that is provided to choice logic module indicates successful signal timing recovery has been achieved when: (1) the modified correlation function exceeds the symbol timing recovery threshold, (2) the rate of fall of the modified correlation function exceeds a rate of fall threshold, (3) the first power corresponding to the samples of moving window (S$_1$) 901 exceeds the first power threshold, and (4) the second power corresponding to the samples of moving window (S$_2$) 902 exceeds the second power threshold. Again, in some instances, these power thresholds are the same; in other embodiments, they are different.

Figure 10:
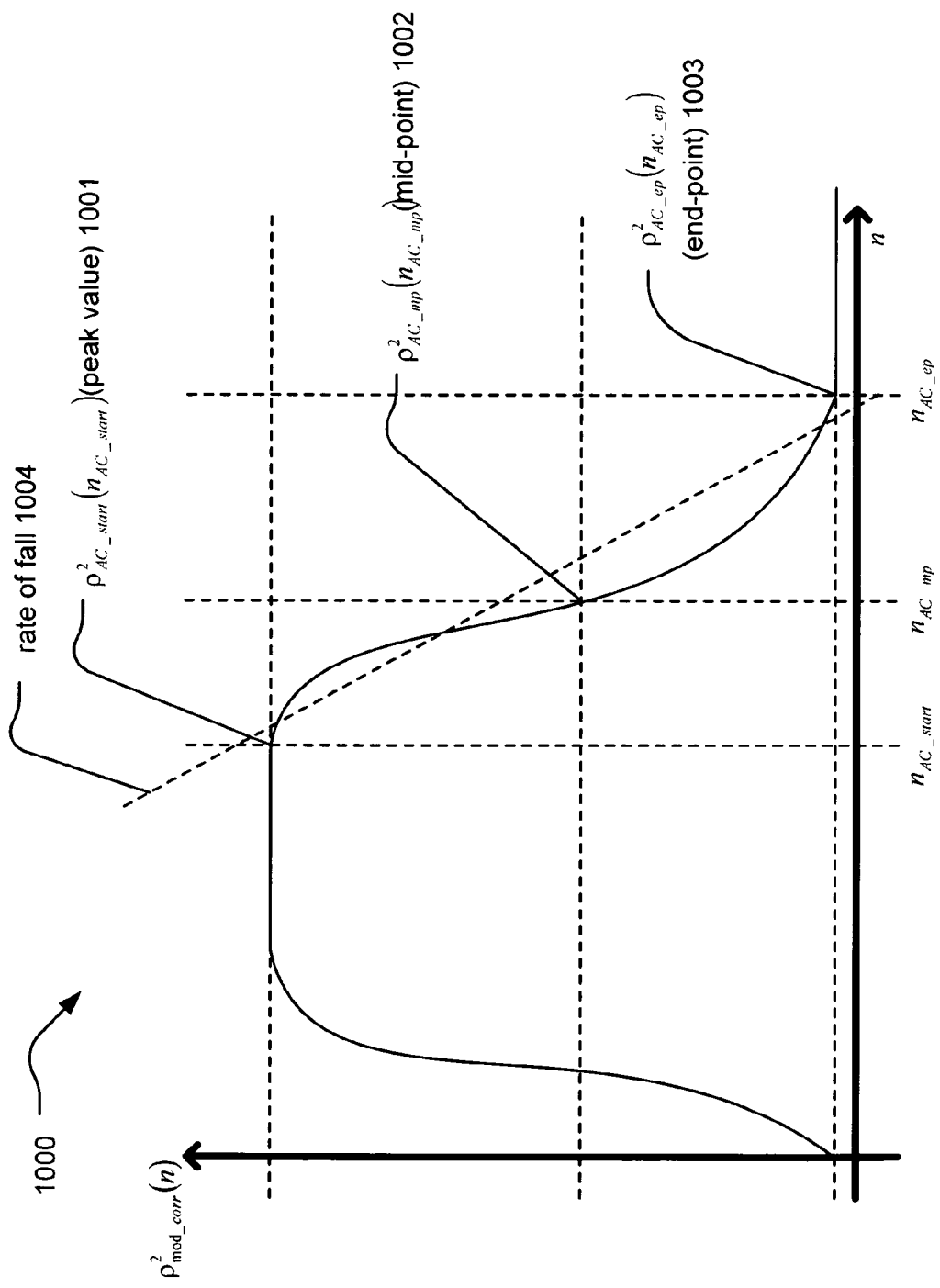
FIG. 10 is a diagram illustrating an embodiment of a modified correlation function as a function of samples.

FIG. 10 is a diagram illustrating an embodiment 1000 of a modified correlation function as a function of samples. This diagram shows one possible embodiment of many of the various calculations that are performed with respect to the functionality 900 of the FIG. 9 that is operable to support symbol timing recovery processing.

Generally speaking, this diagram shows the modified correlation function, $\rho_{mod\_corr}^2(n)$, as a function of sample, n. The modified correlation function, $\rho_{mod\_corr}^2(n)$, typically will rise and flatten out as the symbols of the STS of an OFDM packet are typically well correlated. When the LTS is encountered and processed, the symbols located therein are not typically well correlated. As such, the modified correlation function, $\rho_{mod\_corr}^2(n)$, typically falls and flattens out because of this characteristic of the symbols within the LTS of an OFDM packet. The rate of increase of the modified correlation function, $\rho_{mod\_corr}^2(n)$, and the rate of fall 1004 over a decreasing region of the modified correlation function, $\rho_{mod\_corr}^2(n)$, may be identical. As can be seen, the modified correlation function is monotonically decreasing starting when considering this region depicted by the rate of fall 1004.

For example, the symbols within the STS of an OFDM packet may be correlated very well leading to a very rapid rise of the modified correlation function, $\rho_{mod\_corr}^2(n)$. However, the symbols within the LTS of an OFDM packet may be somewhat correlated initially and then very poorly correlated thereafter leading to a relatively slow rate of fall 1004. Alternatively, the symbols within the LTS of an OFDM packet may very poorly correlated from the very beginning leading to a very precipitous rate of fall 1004.

The following points are also identified within the FIG. 10:

$\rho_{AC\_start}^2(n_{AC\_start})$ (peak value) 1001 is the modified correlation function at this peak value (or starting value) which is located as sample, $n_{AC\_start}$;

$\rho_{AC\_mp}^2(n_{AC\_mp})$ (mid-point) 1002 is the modified correlation function at this mid-point value which is located as sample, $n_{AC\_mp}$; and $\rho_{AC\_ep}^2(n_{AC\_ep})$ (end-point) 1003 is the modified correlation function at this end-point value which is located as sample, $n_{AC\_ep}$.

The reader is encouraged consider the FIG. 10 in conjunction with the description of the functionality 900 of the FIG. 9 that is operable to support symbol timing recovery processing. The FIG. 10 is intended to provide a clearer representation of the calculations performed within and according to the functionality of the FIG. 9.

Figure 11A:
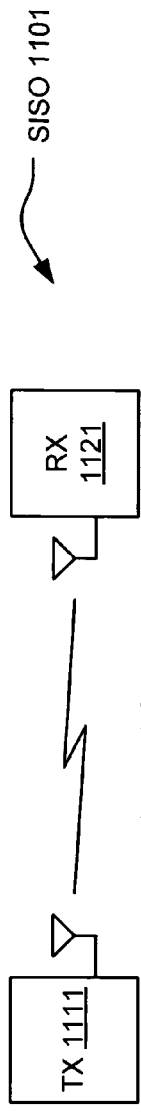
FIG. 11A is a diagram illustrating an embodiment of a single-input-single-output (SISO) communication system.

FIG. 11A is a diagram illustrating an embodiment of a single-input-single-output (SISO) communication system 1101. A transmitter (TX 1111) having a single transmit antenna communicates with a receiver (RX 1121) having a single receive antenna.

Figure 11B:
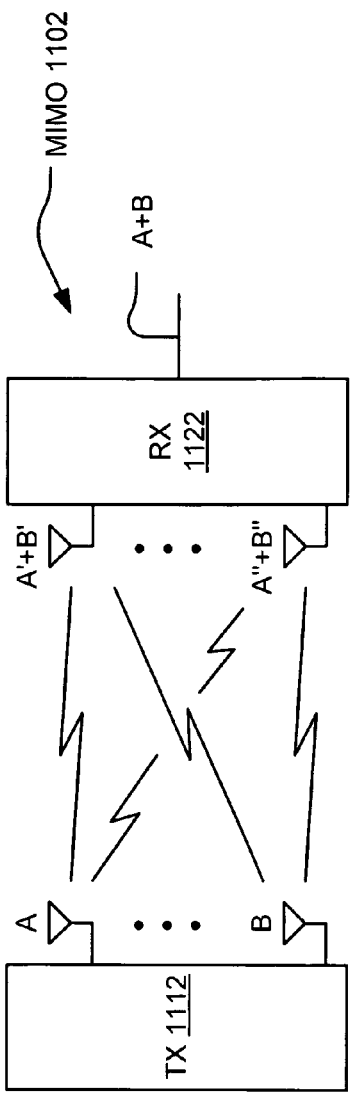
FIG. 11B is a diagram illustrating an embodiment of a multiple-input-multiple-output (MIMO) communication system.

FIG. 11B is a diagram illustrating an embodiment of a multiple-input-multiple-output (MIMO) communication system 1102. A transmitter (TX 1112) having multiple transmit antennae communicates with a receiver (RX 1122) having multiple receive antennae. Looking only at 2 of the plurality of antennae at either end of the communication channel, a first antenna transmits A and a second antenna transmits B. At the RX 1122, a first antenna receives A'+B' and a second antenna receives A"+B". The RX 1122 includes the appropriate functionality to perform the extraction and generation of a signal that is a best estimate of the transmitted signal A+B.

Figure 11D:
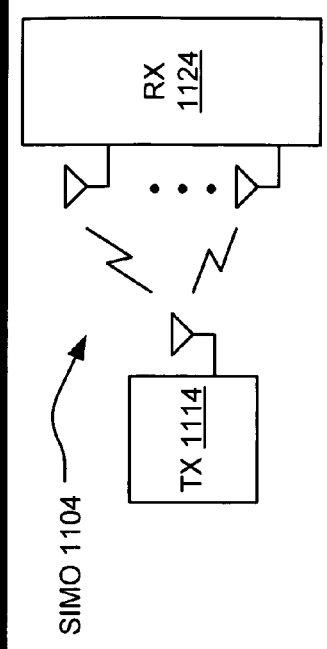
FIG. 11D is a diagram illustrating an embodiment of a single-input-multiple-output (SIMO) communication system.
Figure 11C:
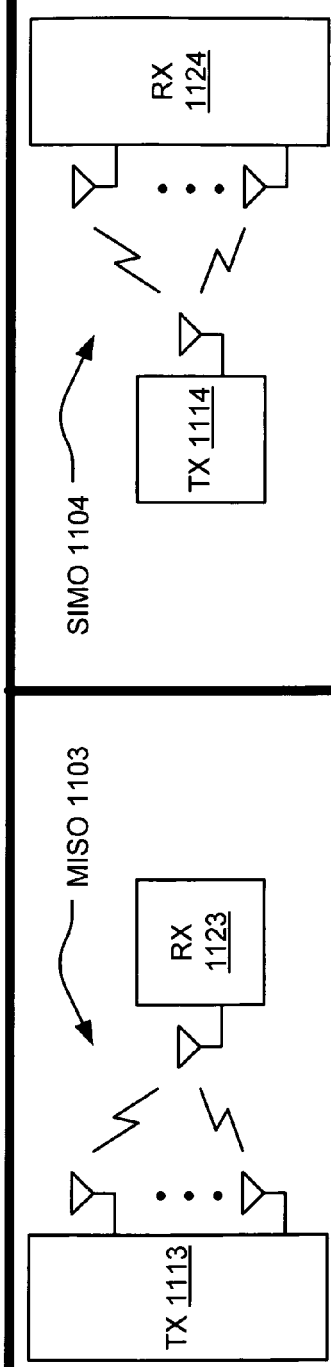
FIG. 11C is a diagram illustrating an embodiment of a multiple-input-single-output (MISO) communication system.

FIG. 11C is a diagram illustrating an embodiment of a multiple-input-single-output (MISO) communication system 1103. A transmitter (TX 1113) having multiple transmit antennae communicates with a receiver (RX 1123) having a single receive antenna.

FIG. 11D is a diagram illustrating an embodiment of a single-input-multiple-output (SIMO) communication system 1104. A transmitter (TX 1114) having a single transmit antenna communicates with a receiver (RX 1124) having multiple receive antennae. A SIMO communication system may be viewed as being the opposite of a MISO embodiment.

While some of these embodiments presented above (e.g., FIG. 11A and FIG. 11C) show receivers processing only a singular stream, the principles presented above with respect to symbol timing recovery processing may be applied. While multiple symbol timing recovery signals are not generated in such single stream embodiments thereby requiring the choice logic functionality described above with respect to other embodiments, the various embodiments of symbol timing recovery processing may nevertheless be employed to assist in performing timing recovery for a singular received signal.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
   a first symbol timing recovery module that is operable to:
      calculate a modified correlation function that varies as a function of each sample of a first plurality of samples of a first moving window and each sample of a second plurality of samples of a second moving window of an OFDM (Orthogonal Frequency Division Multiplexing) packet, wherein the modified correlation function is normalized with respect to a first power corresponding to the first moving window and a second power corresponding to the second moving window;

compare the modified correlation function to a symbol timing recovery threshold;
   identify a peak value of the modified correlation function when the modified correlation function exceeds the symbol timing recovery threshold and when the modified correlation function is substantially non-increasing;
   identify a mid-point of a decreasing region of the modified correlation function that, when biased by a predetermined amount, is less than the peak value of the modified correlation function;
   identify an end-point of the decreasing region of the modified correlation function that, when scaled by a predetermined scaling factor, is less than the peak value of the modified correlation function;
   compare the first power corresponding to the first plurality of samples of the first moving window to a first power threshold; and
   compare the second power corresponding to the second plurality of samples of the second moving window to a second power threshold; and
   a choice logic module that is operable to:
      receive a first symbol timing recovery signal, corresponding to a first stream of a plurality of receive streams, from the first symbol timing recovery module;
      receive a second symbol timing recovery signal, corresponding to a second stream of the plurality of receive streams, from a second symbol timing recovery module that is also implemented within the apparatus;
      receive a first carrier detect signal, corresponding to the first stream of the plurality of receive streams, from a first carrier detect module that is also implemented within the apparatus;
      receive a second carrier detect signal, corresponding to a second stream of the plurality of receive streams, from a second carrier detect module that is also implemented within the apparatus; and
      based on the first carrier detect signal and the second carrier detect signal, select either the first symbol timing recovery signal, the second symbol timing recovery signal, or a non-symbol timing recovery signal for each of the first stream and the second stream of the plurality of receive streams.

2. The apparatus of claim 1, wherein:
   the choice logic module selects the non-symbol timing recovery signal for each of the first stream and the second stream of the plurality of receive streams when the first carrier detect signal and the second carrier detect signal both indicate no carrier detect;
   the choice logic module selects the second symbol timing recovery signal for each of the first stream and the second stream of the plurality of receive streams when the first carrier detect signal indicates no carrier detect and the second carrier detect signal indicates carrier detect;
   the choice logic module selects the first symbol timing recovery signal for each of the first stream and the second stream of the plurality of receive streams when the first carrier detect signal indicates carrier detect and the second carrier detect signal indicates no carrier detect; and
   the choice logic module selects the first symbol timing recovery signal for the first stream of the plurality of receive streams and selects the second symbol timing recovery signal for the second stream of the plurality of receive streams when the first carrier detect signal and the second carrier detect signal both indicate carrier detect.

3. The apparatus of claim 1, wherein:
the choice logic module selects the non-symbol timing recovery signal for each of the first stream and the second stream of the plurality of receive streams when the first carrier detect signal and the second carrier detect signal both indicate no carrier detect; and
the choice logic module selects the first symbol timing recovery signal for the first stream of the plurality of receive streams and selects the second symbol timing recovery signal for the second stream of the plurality of receive streams when at least one of the first carrier detect signal and the second carrier detect signal indicates carrier detect.

4. The apparatus of claim 1, wherein:
the choice logic module is operable to receive the first symbol timing recovery signal at approximately the same time as the choice logic module receives the first carrier detect signal.

5. The apparatus of claim 1, wherein:
the first plurality of samples of the first moving window and the second plurality of samples of the second moving window correspond to symbols that are situated in a STS (Short Training Sequence) of the OFDM packet that has been extracted from a signal received from a communication channel to which the apparatus is communicatively coupled.

6. The apparatus of claim 1, wherein:
the choice logic module is operable to select either the first symbol timing recovery signal, the second symbol timing recovery signal, or the non-symbol timing recovery signal for each of the first stream and the second stream of the plurality of receive streams before completion of processing of an LTS (Long Training Sequence) of the OFDM packet.

7. The apparatus of claim 1, wherein the first symbol timing recovery module is operable to:
determine a rate of fall of the modified correlation function based on the peak value of the modified correlation function, the mid-point of a decreasing region of the modified correlation function, and the end-point of the decreasing region of the modified correlation function.

8. The apparatus of claim 7, wherein the first symbol timing recovery signal indicates symbol timing recovery for the first stream of the plurality of receive streams when:
the modified correlation function exceeds the symbol timing recovery threshold;
the rate of fall of the modified correlation function exceeds a rate of fall threshold;
the first power corresponding to the first plurality of samples of the first moving window exceeds the first power threshold; and
the second power corresponding to the second plurality of samples of the second moving window exceeds the second power threshold.

9. The apparatus of claim 1, wherein the apparatus is operable to:
receive a packet gain settle signal that indicates if the apparatus is operating at a steady-state operating condition after any change in gain that is applied to the OFDM packet; and wherein:
the choice logic module selects the non-symbol timing recovery signal for each of the first stream and the second stream of the plurality of receive streams when the packet gain settle signal indicates that the apparatus is not operating at a steady-state operating condition.

10. A method, comprising:
calculating a modified correlation function that varies as a function of each sample of a first plurality of samples of a first moving window and each sample of a second plurality of samples of a second moving window of an OFDM (Orthogonal Frequency Division Multiplexing) packet corresponding to a stream of a plurality of receive streams, wherein the modified correlation function is normalized with respect to a first power corresponding to the first plurality of samples of the first moving window and a second power corresponding to the second plurality of samples of the second moving window;
comparing the modified correlation function to a symbol timing recovery threshold;
identifying a peak value of the modified correlation function when the modified correlation function exceeds the symbol timing recovery threshold and when the modified correlation function is substantially non-increasing;
identifying a mid-point of a decreasing region of the modified correlation function that, when biased by a predetermined amount, is less than the peak value of the modified correlation function;
identifying an end-point of the decreasing region of the modified correlation function that, when scaled by a predetermined scaling factor, is less than the peak value of the modified correlation function;
comparing the first power corresponding to the first plurality of samples of the first moving window to a first power threshold;
comparing the second power corresponding to the second plurality of samples of the second moving window to a second power threshold;
employing a combining module to generate a symbol timing recovery signal corresponding to the stream of the plurality of receive streams.

11. The method of claim 10, wherein the symbol timing recovery signal corresponding to the stream of the plurality of receive streams is a first symbol timing recovery signal corresponding to a first stream of the plurality of receive streams; and further comprising:
receiving the first symbol timing recovery signal, corresponding to the first stream of the plurality of receive streams;
receiving a second symbol timing recovery signal, corresponding to a second stream of the plurality of receive streams;
receiving a first carrier detect signal, corresponding to the first stream of the plurality of receive streams;
receiving a second carrier detect signal, corresponding to the second stream of the plurality of receive streams; and
based on the first carrier detect signal and the second carrier detect signal, selecting either the first symbol timing recovery signal, the second symbol timing recovery signal, or a non-symbol timing recovery signal for each of the first stream and the second stream of the plurality of receive streams.

12. The method of claim 11, further comprising:
selecting the non-symbol timing recovery signal for each of the first stream and the second stream of the plurality of receive streams when the first carrier detect signal and the second carrier detect signal both indicate no carrier detect;
selecting the second symbol timing recovery signal for each of the first stream and the second stream of the plurality of receive streams when the first carrier detect signal indicates no carrier detect and the second carrier detect signal indicates carrier detect;

selecting the first symbol timing recovery signal for each of the first stream and the second stream of the plurality of receive streams when the first carrier detect signal indicates carrier detect and the second carrier detect signal indicates no carrier detect; and selecting the first symbol timing recovery signal for the first stream of the plurality of receive streams and selecting the second symbol timing recovery signal for the second stream of the plurality of receive streams when the first carrier detect signal and the second carrier detect signal both indicate carrier detect.

13. The method of claim 11, further comprising:

selecting the non-symbol timing recovery signal for each of the first stream and the second stream of the plurality of receive streams when the first carrier detect signal and the second carrier detect signal both indicate no carrier detect; and selecting the first symbol timing recovery signal for the first stream of the plurality of receive streams and selecting the second symbol timing recovery signal for the second stream of the plurality of receive streams when at least one of the first carrier detect signal and the second carrier detect signal indicates carrier detect.

14. The method of claim 11, further comprising:

receiving the first symbol timing recovery signal at approximately the same time as receiving the first carrier detect signal.

15. The method of claim 11, further comprising:

receiving a signal from a communication channel;

extracting the first plurality of samples of the first moving window and the second plurality of samples of the second moving window from the signal received from the communication channel; and the first plurality of samples of the first moving window and the second plurality of samples of the second moving window are situated in a STS (Short Training Sequence) of the OFDM packet.

16. The method of claim 15, further comprising:

selecting either the first symbol timing recovery signal, the second symbol timing recovery signal, or the non-symbol timing recovery signal for at least one stream of the plurality of receive streams before completion of processing of an LTS (Long Training Sequence) of the OFDM packet.

17. The method of claim 10, further comprising:

determining a rate of fall of the modified correlation function based on the peak value of the modified correlation function, the mid-point of a decreasing region of the modified correlation function, and the end-point of the decreasing region of the modified correlation function.

18. The method of claim 17, wherein the symbol timing recovery signal corresponding to the stream of the plurality of receive streams indicates symbol timing recovery when:

the modified correlation function exceeds the symbol timing recovery threshold;

the rate of fall of the modified correlation function exceeds a rate of fall threshold;

the first power corresponding to the first plurality of samples of the first moving window exceeds the first power threshold; and the second power corresponding to the second plurality of samples of the second moving window exceeds the second power threshold.

19. The method of claim 10, wherein:

the symbol timing recovery signal corresponding to the stream of the plurality of receive streams is a first symbol timing recovery signal corresponding to a first stream of the plurality of receive streams; and further comprising:

generating a second symbol timing recovery signal corresponding to a second stream of the plurality of receive streams;

receiving a packet gain settle signal that indicates if the method is operating at a steady-state operating condition after any change in gain that is applied to the OFDM packet; and selecting a non-symbol timing recovery signal for each of the first stream and the second stream of the plurality of receive streams when the packet gain settle signal indicates that the apparatus is not operating at a steady-state operating condition.

20. An apparatus, comprising:

a first symbol timing recovery module that is operable to generate a first symbol timing recovery signal corresponding to a first stream of a plurality of receive streams; and a second symbol timing recovery module that is operable to generate a second symbol timing recovery signal corresponding to a second stream of the plurality of receive streams; and a choice logic module that is operable to:

receive a first carrier detect signal, corresponding to the first stream of the plurality of receive streams;

receive a second carrier detect signal, corresponding to a second stream of the plurality of receive streams; and based on the first carrier detect signal and the second carrier detect signal, select either the first symbol timing recovery signal, the second symbol timing recovery signal, or a non-symbol timing recovery signal for each of the first stream and the second stream of the plurality of receive streams.

21. The apparatus of claim 20, wherein:

the first symbol timing recovery module that is operable to:

calculate a modified correlation function that varies as a function of each sample of a first plurality of samples of the first moving window and each sample of a second plurality of samples of the second moving window of an OFDM (Orthogonal Frequency Division Multiplexing) packet corresponding to a first stream of the plurality of receive streams, wherein the modified correlation function is normalized with respect to a first power corresponding to the first plurality of samples of the first moving window and a second power corresponding to the second plurality of samples of the second moving window;

compare the modified correlation function to a symbol timing recovery threshold;

identify a peak value of the modified correlation function when the modified correlation function exceeds the symbol timing recovery threshold and when the modified correlation function is substantially non-increasing;

identify a mid-point of a decreasing region of the modified correlation function that, when biased by a predetermined amount, is less than the peak value of the modified correlation function;

identify an end-point of the decreasing region of the modified correlation function that, when scaled by a predetermined scaling factor, is less than the peak value of the modified correlation function;

compare the first power corresponding to the first plurality of samples of the first moving window to a first power threshold; and compare the second power corresponding to the second plurality of samples of the second moving window to a second power threshold; and wherein:

the first symbol timing recovery signal indicates symbol timing recovery for the first stream of the plurality of receive streams when:

the modified correlation function exceeds the symbol timing recovery threshold;

the rate of fall of the modified correlation function exceeds a rate of fall threshold;

the first power corresponding to the first plurality of samples of the first moving window exceeds the first power threshold; and the second power corresponding to the second plurality of samples of the second moving window exceeds the second power threshold.

22. The apparatus of claim 20, wherein:

the choice logic module selects the non-symbol timing recovery signal for each of the first stream and the second stream of the plurality of receive streams when the first carrier detect signal and the second carrier detect signal both indicate no carrier detect;

the choice logic module selects the second symbol timing recovery signal for each of the first stream and the second stream of the plurality of receive streams when the first carrier detect signal indicates no carrier detect and the second carrier detect signal indicates carrier detect;

the choice logic module selects the first symbol timing recovery signal for each of the first stream and the second stream of the plurality of receive streams when the first carrier detect signal indicates carrier detect and the second carrier detect signal indicates no carrier detect; and the choice logic module selects the first symbol timing recovery signal for the first stream of the plurality of receive streams and selects the second symbol timing recovery signal for the second stream of the plurality of receive streams when the first carrier detect signal and the second carrier detect signal both indicate carrier detect.

23. The apparatus of claim 20, wherein:

the choice logic module selects the non-symbol timing recovery signal for each of the first stream and the second stream of the plurality of receive streams when the first carrier detect signal and the second carrier detect signal both indicate no carrier detect; and the choice logic module selects the first symbol timing recovery signal for the first stream of the plurality of receive streams and selects the second symbol timing recovery signal for the second stream of the plurality of receive streams when at least one of the first carrier detect signal and the second carrier detect signal indicates carrier detect.

24. The apparatus of claim 20, wherein:

the choice logic module is operable to receive the first symbol timing recovery signal at approximately the same time as the choice logic module receives the first carrier detect signal.

25. The apparatus of claim 20, wherein the apparatus is operable to:

receive a packet gain settle signal that indicates if the apparatus is operating at a steady-state operating condition after any change in gain that is applied to the OFDM packet; and wherein:

the choice logic module selects the non-symbol timing recovery signal for each of the first stream and the second stream of the plurality of receive streams when the packet gain settle signal indicates that the apparatus is not operating at a steady-state operating condition.

* * * * *